United States Patent
Guy (10) Patent No.: US 7,478,983 B2
(45) Date of Patent: Jan. 20, 2009

(54) TOOL ASSEMBLY

(75) Inventor: Hanoch Guy, Petach Tikva (IL)

(73) Assignee: E.T.M. Precision Tools Manufacturing Ltd. (IL)

( * ) Notice: Subject to any disclaimer, the term of this patent is extended or adjusted under 35 U.S.C. 154(b) by 520 days.

(21) Appl. No.: 11/197,510

(22) Filed: Aug. 5, 2005

(65) Prior Publication Data

US 2006/0056933 A1    Mar. 16, 2006

(30) Foreign Application Priority Data

Sep. 14, 2004    (IL) .................................... 164069

(51) Int. Cl.
*B23C 5/26* (2006.01)
*B23B 31/20* (2006.01)

(52) U.S. Cl. .............. 409/232; 279/43.2; 279/43.3; 409/234

(58) Field of Classification Search ............ 409/234, 409/232, 233; 408/239 R, 239 A, 240; 82/160, 82/158; 279/42, 43, 43.1, 43.2, 43.3, 46.1, 279/46.2, 46.3, 46.6, 50, 51, 53, 48
See application file for complete search history.

(56) References Cited

U.S. PATENT DOCUMENTS 3,311,023 A * 3/1967 Kaiser .................. 409/232
4,102,035 A    7/1978 Voglrieder et al.
4,553,886 A * 11/1985 Vasilchenko et al. ........ 409/233
4,684,301 A    8/1987 Eckle
4,834,597 A    5/1989 Andersson et al.
5,372,465 A * 12/1994 Smith .................... 409/232
5,407,308 A    4/1995 Takayoshi
5,997,226 A    12/1999 Tagami
6,079,919 A    6/2000 Zosi
6,599,068 B1 * 7/2003 Miyazawa ............... 409/234
2008/0247832 A1* 10/2008 Maier et al. ............. 408/239 R

FOREIGN PATENT DOCUMENTS

DE    4012220    10/1991
EP    0294348    4/1988

OTHER PUBLICATIONS

International Search Report, International Application No. PCT/IL2005/000943 dated Jan. 19, 2006.

* cited by examiner

*Primary Examiner*—Erica E Cadugan
(74) *Attorney, Agent, or Firm*—Womble Carlyle Sandridge & Rice (57) ABSTRACT

A tool assembly in which a tool is releasably mounted on a tool holder. The tool is supported by the tool holder at two spaced apart regions which are formed independently therefore alignment between the axes of the tool and tool holder does not rely on tight manufacturing tolerances.

26 Claims, 7 Drawing Sheets

TOOL ASSEMBLY

FIELD OF THE INVENTION

The present invention relates to a tool assembly comprising a tool holder and a tool for metal Working operations and a clamping mechanism for securing the tool to the tool holder, the clamping mechanism being of the type wherein the tool is provided with a coupling member and is secured by means of a collet.

BACKGROUND OF THE INVENTION

In such tool assemblies the tool holder is installed on a power driven machine, and the tool is a cutting tool, an adaptor for holding tools or any other means required for performing a metal working operation. The clamping mechanism provides a means for quickly changing tools during the metal working operations.

The coupling mechanism has the main objectives of transferring torque by, inter alia, frictional force from a spindle via the tool holder to the tool while maintaining alignment between the rotational axes of the tool and spindle. In order to achieve these objectives, the shank of the tool and the socket of the tool holder are typically formed with compatible conical geometries, while a collet and coupling member ensure "full coupling" between these geometries. "Full coupling" is defined as contact of about 70% of the length between the shank and socket faces and is achieved by the following two conditions. First, the diameters of the shank and socket, at their widest ends and narrowest ends, must not exceed their required dimensions by more than several microns. Second, a significant drawing force has to be applied via the collet onto the coupling member. Typically, the shank is hollow and the periphery walls of the socket are designed to be resilient in order to enable the required elastic deformation for "full coupling".

U.S. Pat. No. 6,079,919 describes a clamping mechanism wherein the shank has a cone shape which corresponds to the internal cone shape of the socket. A high tensile force ensures "full coupling" between the shank and socket. In order to ensure alignment of rotational axes between the spindle and tool, tight tolerances must be maintained during manufacturing of the shank and socket. In this type of clamping mechanism, any error occurring during manufacturing or any obstruction such as dirt or a metal chip caught between the shank and socket will cause miss alignment.

Another example of a clamping mechanism is described in U.S. Pat. No. 5,407,308. The coupling between the shank and socket occurs in two regions: in a region of a tapered portion adjacent a wider end of the shank and in a region of a cylindrical portion adjacent a narrower end thereof The short tapered portion of the shaft extends over approximately a ⅓ of the axial length of the socket. As a result, a relatively smaller force is required in order to ensure "full coupling". However, in order to ensure alignment of rotational axes between the spindle and tool, tight manufacturing tolerances are still required during manufacturing of the tapered and cylindrical portions of the shaft and socket.

It is an object of the present invention to provide a clamping mechanism that significantly reduces or overcomes the aforementioned disadvantages.

SUMMARY OF THE INVENTION

In accordance with the present invention there is provided a tool assembly comprising a tool holder and a tool;

the tool has a longitudinal tool axis and comprises a tool head, a coupling member and a shank therebetween; the shank tapers axially rearwardly from the tool head to the coupling member, the coupling member extends axially rearwardly from the shank and comprises a frustoconical head that tapers forwardly, the tool holder comprises a sleeve and a collet, the sleeve has a longitudinal sleeve axis and comprises a cavity having a cavity wall which opens out to a forward end thereof, the cavity wall comprises a forward tapering portion and a cylindrical portion, the forward tapering portion tapers axially rearwardly from the forward end of the sleeve towards the cylindrical portion; and the collet is located within the cavity and comprises a base at a rear end and at least two bulge portions at a forward end thereof, the base has an axially extending cylindrical peripheral surface and each bulge portion comprises an outer bulge surface and an inner bulge surface, the outer bulge surface has an axially extending cylindrical shape and the inner bulge surface lies on a forwardly tapering conical surface.

In an assembled state, the collet is located in the cavity, and the tool is removably secured to the tool holder.

In a locked-position of the tool assembly, the shank abuts the forward tapering portion of the cavity wall, the peripheral surface of the base abuts the cylindrical portion of the cavity wall, and the inner and outer bulge surfaces of each bulge portion abut, respectively, the head of the coupling member and the cylindrical portion of the cavity wall.

Preferably, a peripheral surface of the shank comprises at least three shank planes, and the forward tapering portion of the cavity wall comprises at least three cavity planes, and an annular groove is located on the cavity wall between the forward tapering portion and the cylindrical portion.

Typically, the shank planes are symmetrically distributed around the tool axis and the cavity planes are symmetrically distributed around the sleeve axis and the number of cavity planes is identical to the number of shank planes.

Preferably, the axial extension of the inner bulge surface overlaps the axial extension of the outer bulge surface.

Typically, the base of the collet has a base surface on a forward end thereof, and a base wall extending forwardly and away from the circumference of the base surface, and a plurality of fingers having each an inner surface, each finger extending forwardly from the base wall and terminating in a given bulge portion.

Preferably, the coupling member further comprises a shaft and a cylindrical cap, the shaft being located between the shank and the head and the cap being located at a rear end of the head.

Typically, in the locked-position of the tool assembly there is a gap between the inner surface of each finger and the cap of the coupling member.

Typically, each cavity plane and each shank plane slant, respectively, towards the sleeve axis and tool axis at a generally similar angle.

Preferably, the number of shank planes is four and the number of cavity planes is four.

In accordance with the present invention there is also provided a method for connecting between a tool and a tool holder of a tool assembly comprising the steps of:

providing a tool having a longitudinal tool axis and comprising a coupling member and a shank; the shank tapering axially rearwardly towards the coupling member, the coupling member extending axially rearwardly from the shank and comprising a frustoconical head that tapers forwardly, providing a tool holder comprising a sleeve and a collet, the sleeve having a longitudinal sleeve axis and comprising a cavity having a cavity wall which opens out to a forward end thereof, the cavity wall comprising a forward tapering portion, a cylindrical portion and an annular groove therebetween, the forward tapering portion tapers axially rearwardly from the forward end of the sleeve and the cylindrical portion forms an alignment surface, the collet being located within the cavity and comprising a base at a rear end and at least two bulge portions at a forward end thereof, the base having a cylindrical shape abutting the cylindrical portion, and each bulge portion being located within the annular groove and comprising an outer bulge surface and an inner bulge surface, the outer bulge surface has an axially extending cylindrical shape and the inner bulge surface lies on a forwardly tapering conical surface, inserting the tool with its rear end leading into the cavity of the tool holder until the head of the coupling member is between the bulge portions of the collet, urging the collet into the cavity until the bulge portions move out of the annular groove and into the cylindrical portion whereby the inner bulge surfaces close onto the head of the coupling member, urging the collet further into the cavity until a forward abutment region is formed by abutment of at least a portion of the shank with at least a portion of the forward tapering portion, urging the collet even further into the cavity until a rear abutment region is formed by abutment between the inner bulge surface and outer bulge surface of each bulge portion with the head of the coupling member and alignment surface of the tool holder, respectively.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
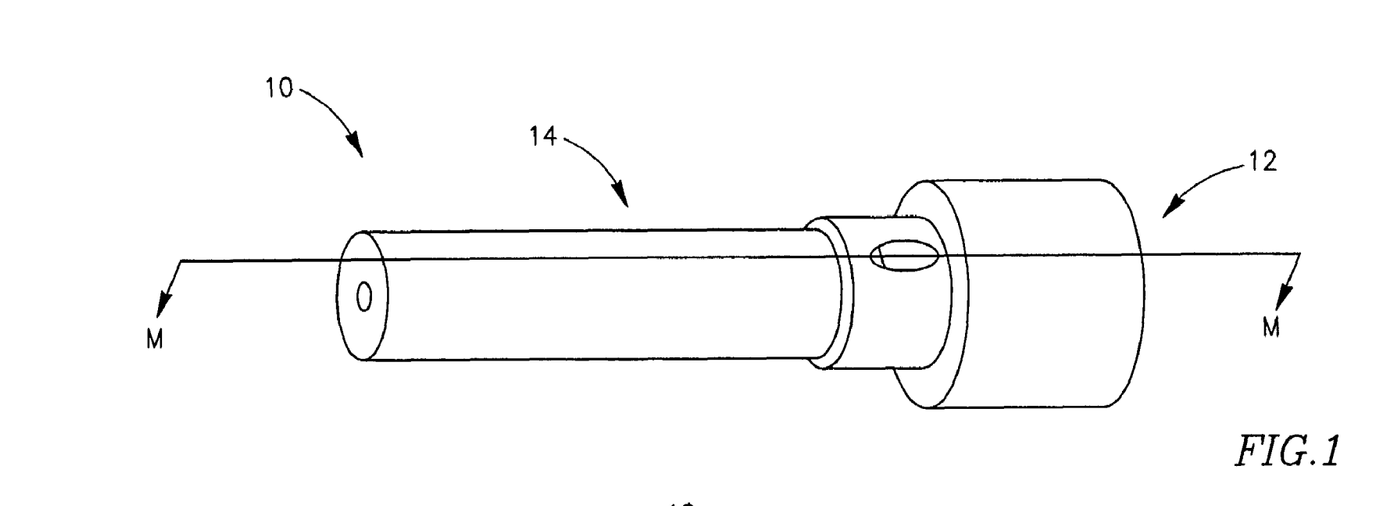
FIG. 1 is a perspective view of a tool assembly in accordance with the present invention.
Figure 2:
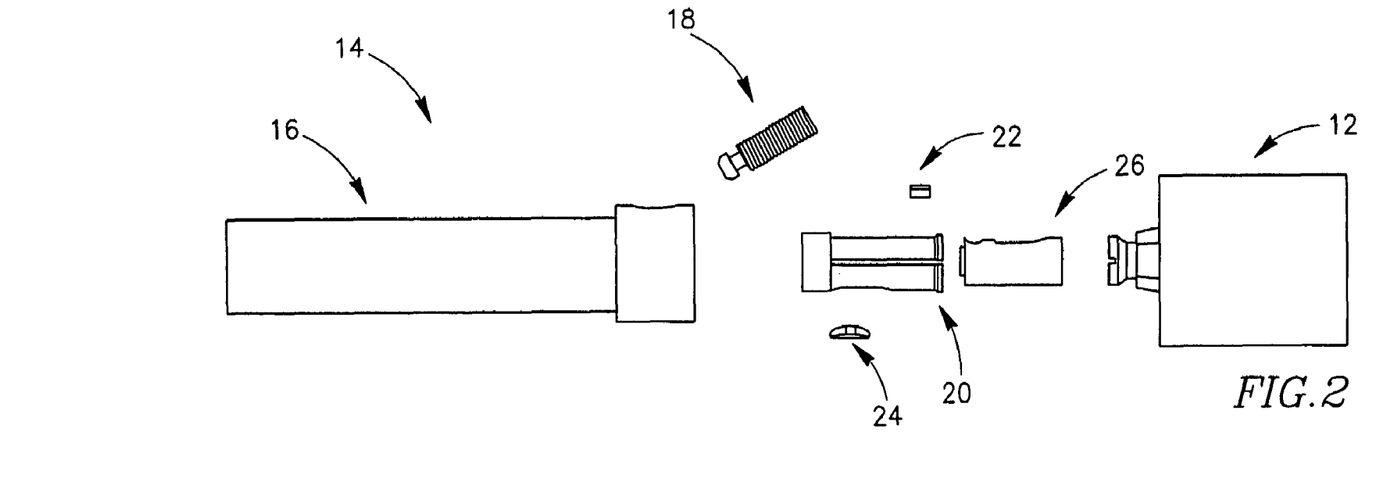
FIG. 2 is an exploded side view of the tool assembly shown in FIG. 1.

Attention is first drawn to FIG. 1 showing a tool assembly 10 comprising a tool 12 detachably mounted on a tool holder 14. In FIG. 2 it is shown that the tool holder 14 comprises a sleeve 16, a locking screw 18, a collet 20, an upper tongue 22, a lower tongue 24, and a pusher 26. The sleeve 16 is open at one end only, and as will be described in greater detail below receives the collet 20, pusher 26, tongues 22, 24 and locking screw 18 for form the tool holder 14 for detachably mounting the tool 12. The closed end of the sleeve 16 is mounted in a machine such as a lathe, milling machine or the like. The closed end of the sleeve 16 is shown schematically and can take on various forms depending on the retaining mechanism of the machine.

It should be noted that directional terms appearing throughout the specification and claims, e.g., "forward", "rear", "upper", "lower", etc., (and derivatives thereof) are used as terms of convenience to distinguish the location of various components of the parts as they appear in the tool assembly 10. The directional terms are for illustrative purposes only, and are not intended to limit the scope of the appended claims. In particular, these terms are used herein in relation to the invention as oriented in FIGS. 2 and 13 to 15. In addition it is noted that the various members shown in the drawings are not always drawn to the same scale for reasons of clarity.

Figure 3:
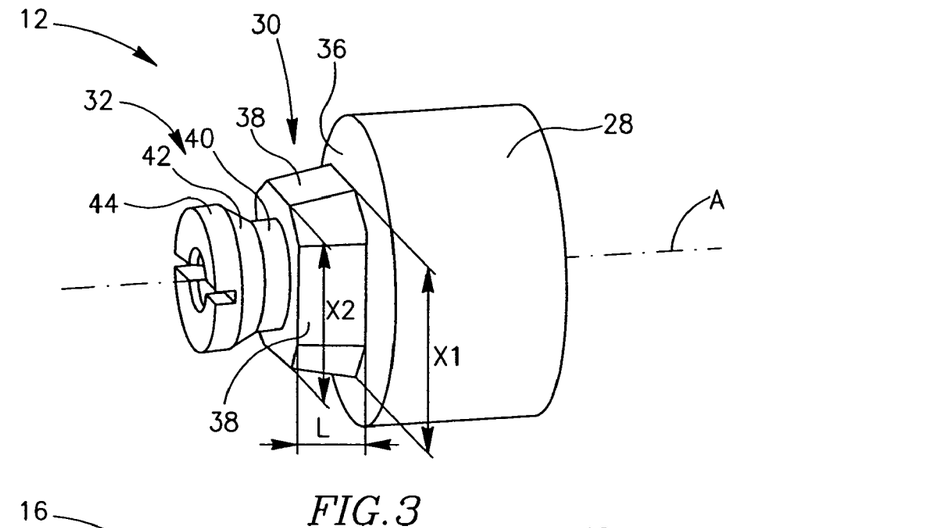
FIG. 3 is a perspective view of a tool in accordance with the present invention.

Attention is now drawn to FIG. 3. The tool 12 comprises a tool head 28, a shank 30 and a coupling member such as a pull stud 32, with the shank 30 being located between the tool head 28 and the coupling member 32. The tool head 28 is illustrated as a cylindrical body extending along a longitudinal tool axis A and having an axially rearwardly facing tool contact surface 36 at a rear end thereof. The tool head 28 can be made into a cutting head for receiving cutting inserts, an adaptor for holding other tools, or any other means typically used in metal working operations.

The shank 30 has a solid body which tapers rearwardly, from the tool contact surface 36 along the tool axis A, and has a length L which is about 15% of a corresponding length of a typical prior art conical shank. The shank 30 has four shank planes 38 (only two are fully seen in this view) which are distributed with 90° symmetry around the tool axis A and, extend rearwardly from the tool contact surface 36 and slant towards the tool axis A. The shank 30 has a first width X1 at its forward end and a second width X2 at its rear end, where the widths are measured between opposing shank planes 38.

The coupling member 32 has a shaft 40, a head 42, and a cap 44, the head 42 being located between the shaft 40 and the cap 44. The shaft 40 and the cap 44 are cylindrical in shape and the head 42 is frustoconical in shape tapering from the cap 44 to the shaft 40 and has a cone angle of about 30°.

Figure 4:
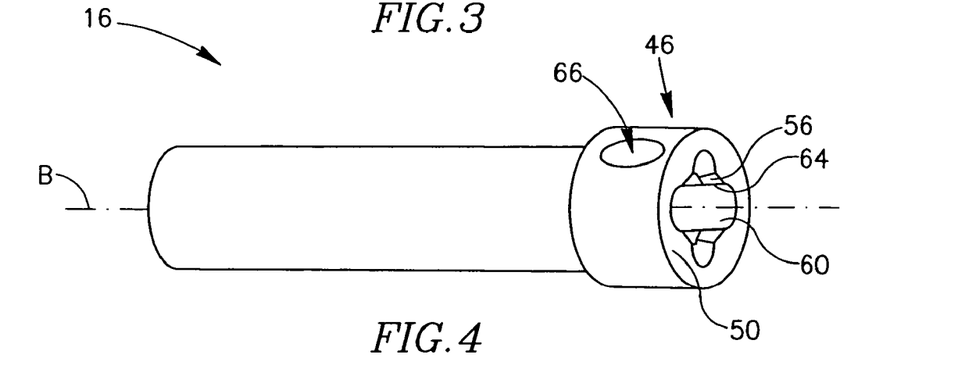
FIG. 4 is a perspective view of a sleeve in accordance with the present invention.
Figure 5:
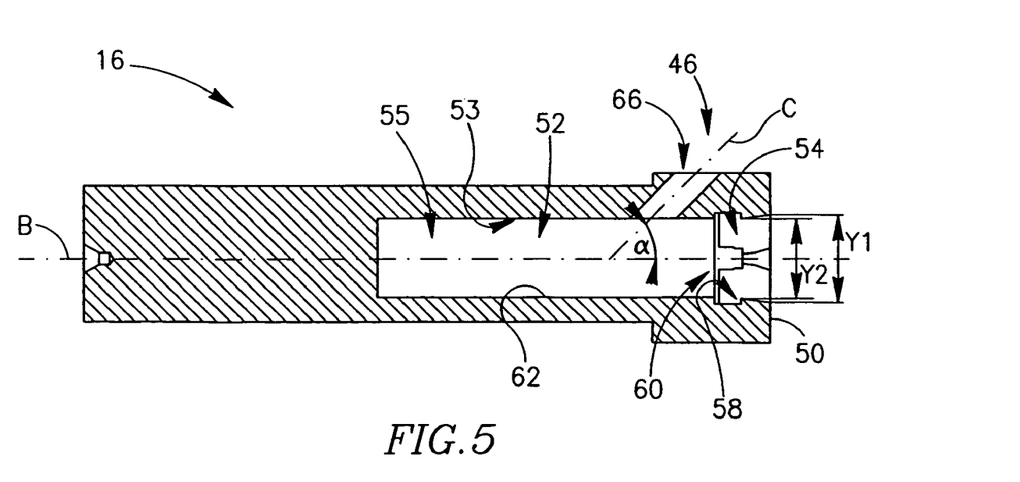
FIG. 5 is a longitudinal cross sectional view of the sleeve, taken in the plane of FIG. 2.

Attention is now drawn to the sleeve 16 which is shown in FIGS. 4 and 5. The sleeve 16 has a rear portion and a forward portion 46 and has a stepped cylindrical shape which extends along a longitudinal sleeve axis B with the forward portion 46 having a larger diameter than the rear portion. The sleeve 16 has a forwardly facing generally annular sleeve contact surface 50 at a forward end thereof. A cavity 52 having a cavity wall 53 is formed in the sleeve 16. The cavity 52 opens out to and extends rearwardly from the sleeve contact surface 50 along the sleeve axis B. The cavity wall 53 has a forward tapering portion 54 which tapers axially rearwardly towards a cylindrical portion 55. Four cavity planes 56 distributed with 90° symmetry around the sleeve axis B are formed on the cavity wall 53 at the forward tapering portion 54 thereof. The cavity planes 56 extend rearwardly from the sleeve contact surface 50 and slant towards the sleeve axis B, and have an axial extent which is less than, or equal to, the length L of the shank. The distance between opposing cavity planes 56 diminishes from a first distance Y1 at a forward end thereof to a second distance Y2 at a rear end thereof. It is noted that the forward portion 46 of the sleeve 16 is designed to have the larger diameter in order to decrease resilience in the vicinity of the cavity planes 56.

An annular groove 58 in the cavity wall 53 extends axially rearwardly from a rear end of the cavity planes 56. Four relief recesses 60 extend rearwardly from the sleeve contact surface 50 along the cavity wall 53 into the annular groove 58, one relief recess being located between adjacent cavity planes 56. The cylindrical portion 55 of the cavity wall 53 extending rearwardly from the annular groove 58 forms an alignment surface 62. A socket rib 64 is defined as an intersection between each cavity plane 56 and relief recess 60. It should be noted that reference made to the annular groove 58 hereinafter, will refer to the full annular extent that the annular groove 58 would occupy if the relief recesses 60 were removed.

A threaded bore 66 having a longitudinal bore axis C extends rearwardly and slants towards the sleeve axis B from a periphery of the forward portion 46 of the sleeve 16 and communicates with the cavity 52. The bore axis C intersects the sleeve axis B forming an acute angle a therebetween.

Figure 6:
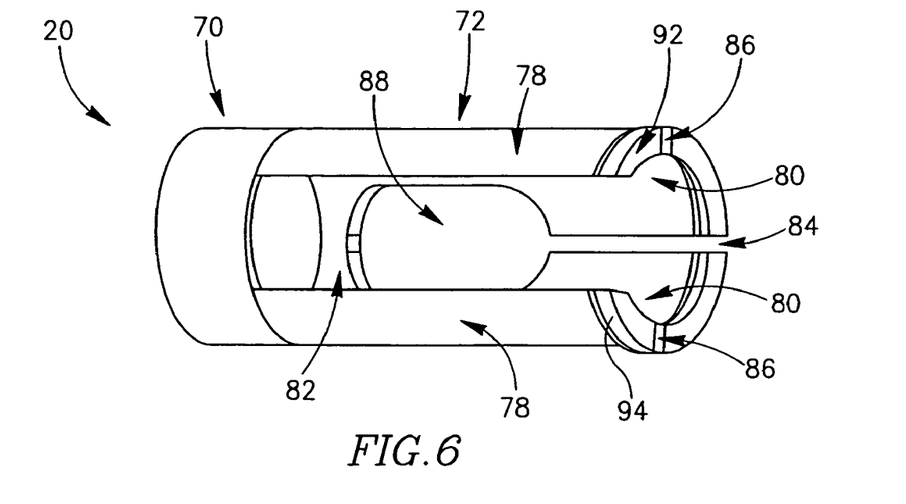
FIG. 6 is a perspective view of a collet in accordance with the present invention.
Figure 7:
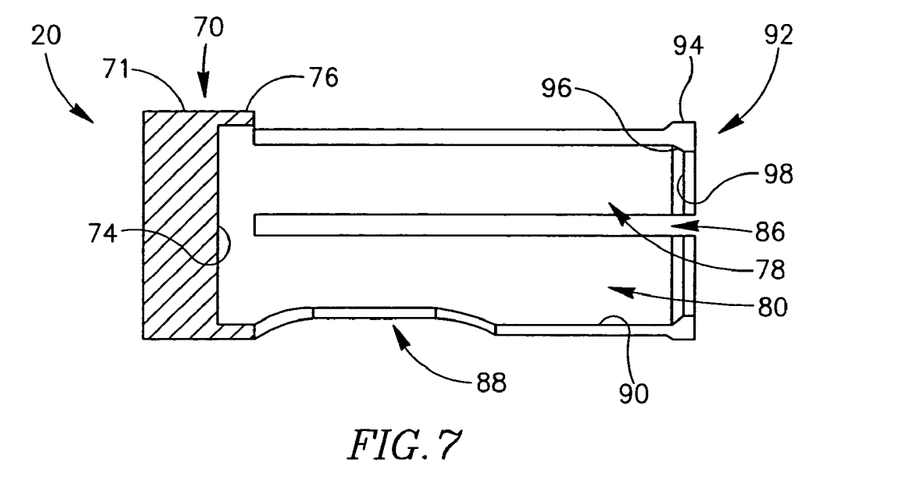
FIG. 7 is a longitudinal cross sectional view of the collet, taken in the plane of FIG. 2.

Attention is now drawn to FIGS. 6 and 7. The collet 20 has a collet head 70 and a finger portion 72. The collet head 70 comprises a cylindrical base 71 having a base surface 74 on a forward end thereof. A base wall 76 extends forwardly and away from the circumference of the base surface 74.

The finger portion 72 comprises two upper fingers 78 and two lower fingers 80 which extend forwardly and away from the base wall 76. The upper fingers 78 have an upper opening 82 located therebetween, and have a smaller angular extension than the angular extension of the lower fingers 80. A short slit 84 is located between the two lower fingers 80, and a long slit 86 is located between each lower finger 80 and upper finger 78. The short and long slits 84, 86 have angular extensions that are smaller than the angular extension of the upper opening 82. A lower opening 88, joint to the two lower fingers 80, is formed diametrically opposite the upper opening 82 and extends between the base wall 76 and the short slit 84.

Figure 16:
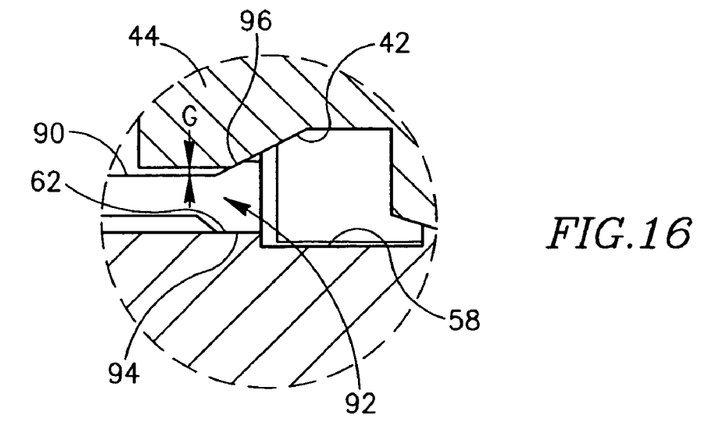
FIG. 16 is a detail of FIG. 15.
Figure 17:
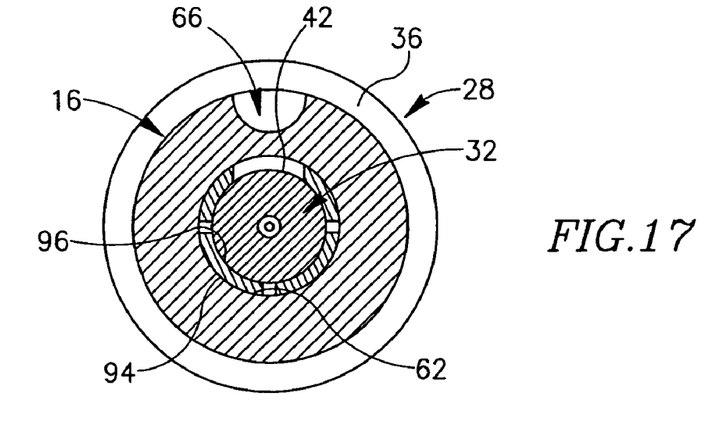
FIG. 17 is a cross sectional view of the tool assembly in a locked position, taken along the line XVII-XVII in FIG. 15.

Each upper and lower finger 78, 80; has an inner surface 90 at an inner end and a bulge portion 92 at a forward end thereof. It is noted that the angular extension of each bulge portion 92 corresponds to the angular extension of its finger. Each bulge portion 92 projects in both a radially inward and radially outward direction and comprises an outer bulge surface 94 at an outer end and an inner bulge surface 96 at an inner end thereof. The outer bulge surface 94 is cylindrically shaped and the inner bulge surface 96 lies on a forwardly tapering conical surface, and terminates at a rim 98. The axial extension of the inner bulge surface 96 overlaps the axial extension of the outer bulge surface 94 (see FIG. 16).

Figure 8:
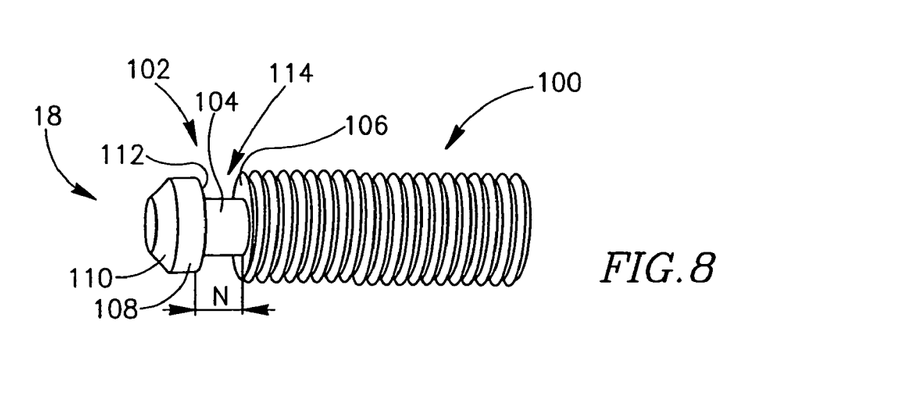
FIG. 8 is a perspective view a locking screw in accordance with the present invention.

Attention is now drawn to FIG. 8 wherein it is shown that the locking screw 18 comprises a rod 100, a tip 102 and a neck 104 extending therebetween. The rod 100 is provided with an external screw thread, is cylindrical in shape and has a fastening surface 106 on a rear end thereof. The neck 104 is cylindrical in shape, has a length N, and has a diameter that is smaller than the diameter of the rod 100. The tip 102 has a cylindrical section 108 and a tapered section 110. The cylindrical section 108 extends rearwardly from a rear end of the neck 104 and has a releasing surface 112 on a forward end thereof. The tapered section 110 tapers rearwardly from a rear end of the cylindrical section 108. It is noted that the diameter of the cylindrical section 108 of the tip 102 is larger than the diameter of the neck 104 and smaller than the diameter of the rod 100. A neck portion 114 is defined by the neck 104, the fastening surface 106 and releasing surface 112.

Figure 9:
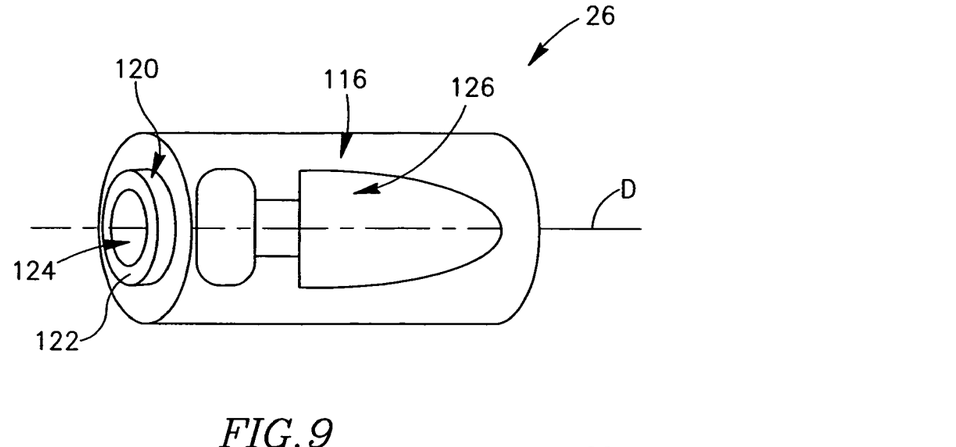
FIG. 9 is a perspective view of a pusher in accordance with the present invention.
Figure 10:
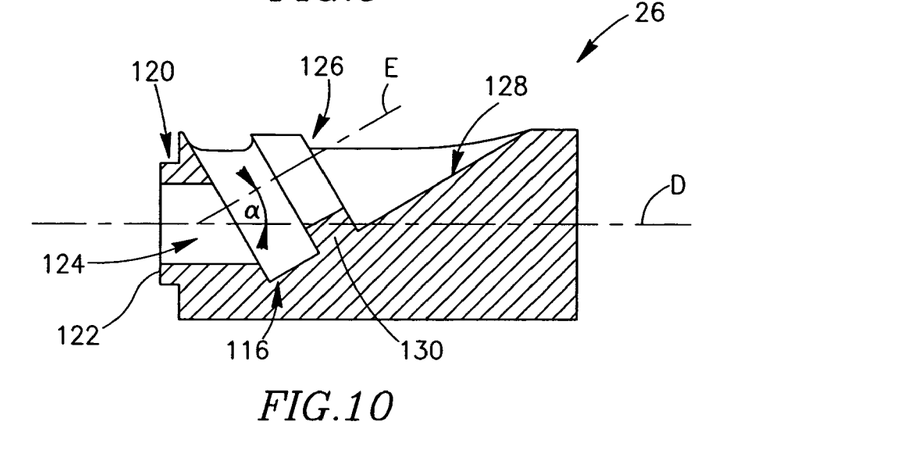
FIG. 10 is a longitudinal cross sectional view of the pusher, taken in the plane of FIG. 2.

Attention is now drawn to FIGS. 9 and 10. The pusher 26 comprises a body 116 having a cylindrical shape and a longitudinal pusher axis D. A protruding member 120 extends axially rearwardly from a rear end of the body 116 and has a cylindrical shape, smaller in diameter than a diameter of the body 116. A pusher face 122 is located on a rear end of the protruding member 120 and a pusher cavity 124 extends axially forwardly from the pusher face 122, through the protruding member 120 and, into the body 116.

A generally longitudinal recess 126 having a recess face 128 is formed in the body 116 and communicates with a peripheral surface of the body 116 and with the pusher cavity 124. The recess face 128 has a projection 130 dividing the recess 126 into two portions. It is noted that the general shape of the recess 126 is such that it can receive the locking screw 18 as is described below with reference to FIG. 13. A longitudinal recess axis E intersects the pusher axis D in the vicinity of the protruding member 120 and extends forwardly and outwardly away from the intersection. The recess axis E and the pusher axis D form therebetween an acute angle equal to the acute angle a between the bore axis C and the sleeve axis B. It should be noted that the projection 130 has an axial extent that is smaller than the length N of the neck 104.

Figure 11:
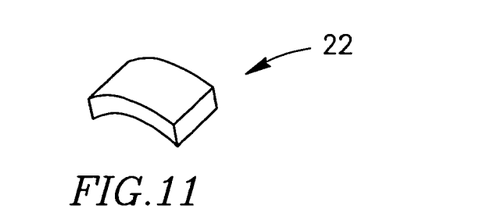
FIG. 11 is a perspective view of an upper tongue in accordance with the present invention.
Figure 12:
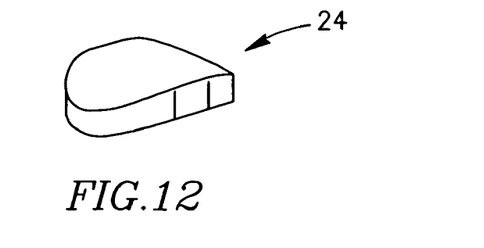
FIG. 12 is a perspective view of a lower tongue in accordance with the present invention.

The upper and lower tongues 22, 24 which are shown in FIGS. 11 and 12 comprise each an outer surface which is convex and an inner surface which is concave. The tongues 22, 24 are shown in an orientation similar to their orientation in the tool holder 14 wherein they are used as spacers between the alignment surface 62 of the sleeve 16 and the peripheral surface of the pusher 26.

Figure 13:
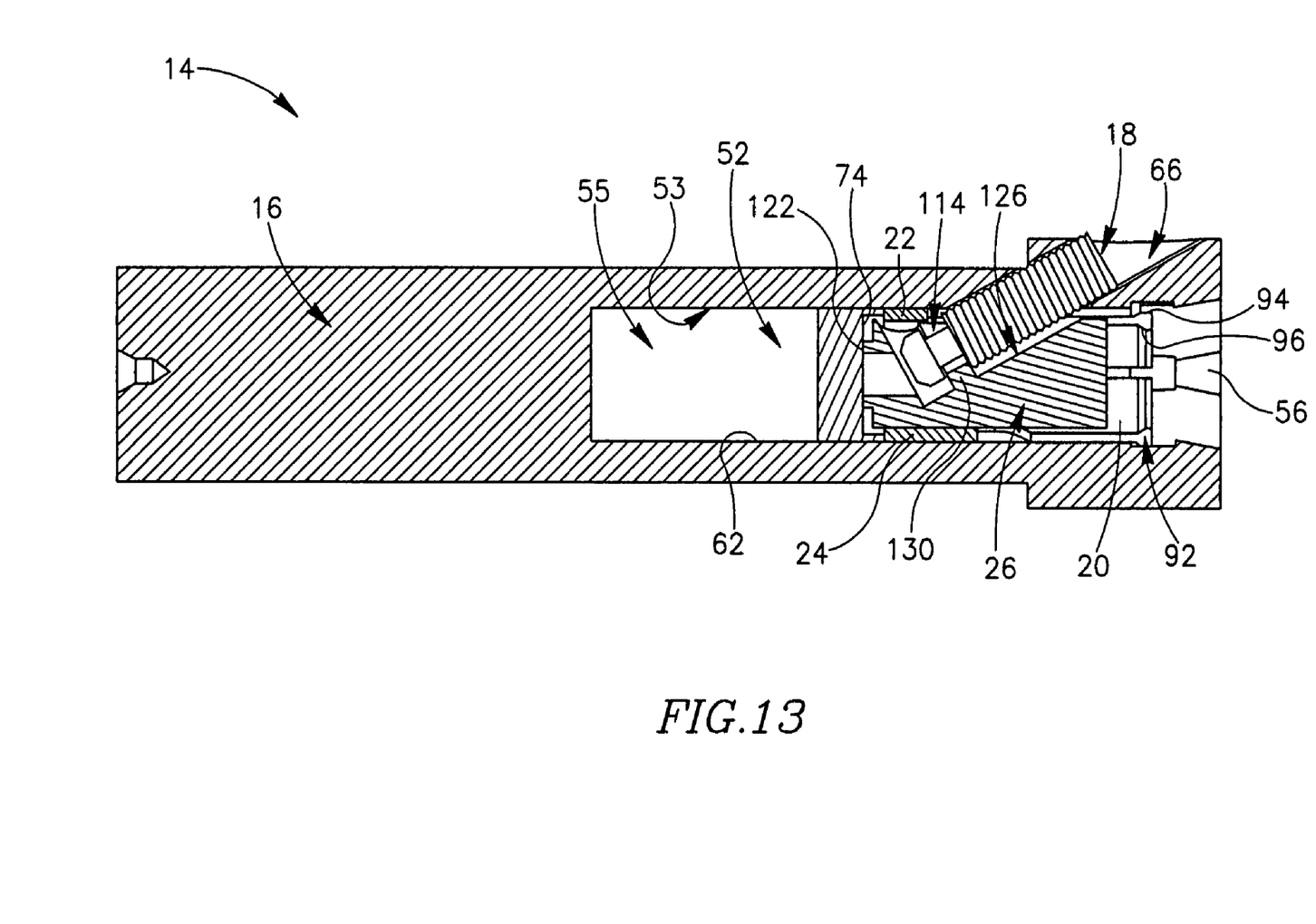
FIG. 13 is a longitudinal cross sectional view of a tool holder of the tool assembly taken in the plane M-M shown in FIG. 1.

The tool holder 14 shown in FIG. 13 is assembled in a three step process.

In step 1, a collet sub-assembly comprising the collet 20, pusher 26 and upper and lower tongues 22, 24 is assembled as following. The pusher 26 is inserted, with its rear end leading, into the collet 20 until the pusher face 122 abuts the base surface 74 of the collet 20. In this position, the collet 20 and pusher 26 are adjusted rotationally until the upper opening 82 of the collet 20 is placed over the recess 126 of the pusher 26. The upper tongue 22 and lower tongue 24 are then placed within the upper opening 82 and lower opening 80 of the collet 20 respectively, with their inner surfaces facing the pusher 26.

In step 2, the collet sub-assembly is urged into the cavity 52 of the sleeve 16 with the rear end of the collet 20 leading. The orientation of the collet sub-assembly in the cavity 52 is adjusted until the bore axis C of the sleeve 16 and the recess axis E of the pusher 26 are generally collinear.

Finally, in step 3, the locking screw 18 is screwed through the threaded bore 66, and passes into the recess 126 of the pusher 26 until the fastening surface 106 of the locking screw 18 abuts the projection 130 of the pusher 26.

In general, the assembly process of the tool holder 14, described above, need only be performed once. In the assembled tool holder 14, the neck portion 114 of the locking screw 18 will cooperate with the projection 130 of the pusher 26 so that on rotation of the locking screw 18 in one direction the collet sub-assembly is urged further into the cavity 52 until reaching a locked-position, and on rotation of the locking screw 18 in the other direction the collet sub-assembly is pulled out of the cavity 52 until reaching an unlocked-position.

Turning now to FIGS. 14 to 18, it will be shown how the cooperation between the neck portion 114 and projection 130 contributes to the releasable mounting of the tool 12 on the tool holder 14.

Figure 14:
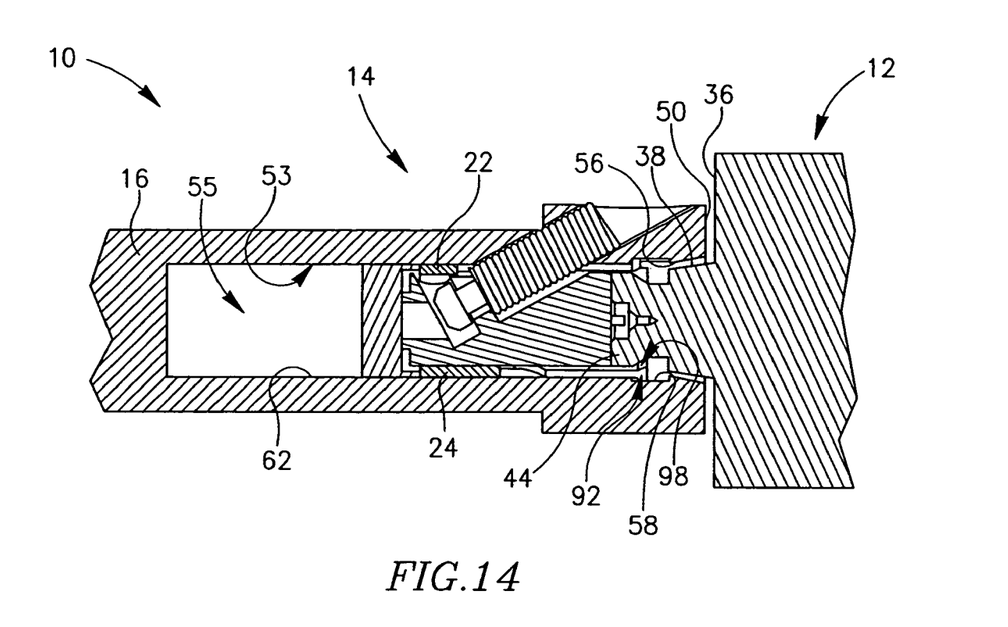
FIG. 14 is a longitudinal cross sectional view of the tool assembly in an unlocked position, taken in the plane M-M shown in FIG. 1.

In FIG. 14, the collet sub-assembly is shown in the unlocked-position. The unlocked-position is characterized, inter alia, by the bulge portions 92 of the collet 20 being located within the annular groove 58. In this location, the rims 98 of the bulge portions 92 lie on a circle having a diameter slightly larger than a diameter of the cap 44 of the coupling member 32. This enables the cap 44 of the coupling member 32 to pass between the bulge portions 92 of the collet 20. In this position, the shank planes 38 of the tool 12 and the cavity planes 56 of the sleeve 16 do not necessarily abut.

While the collet sub-assembly is urged into the cavity, from the unlocked-position shown in FIG. 14 to the locked-position shown in FIGS. 15 to 18, the bulge portions 92 move out of the annular groove 58 further into the cavity 52 and the following three events occur in sequence.

Figure 15:
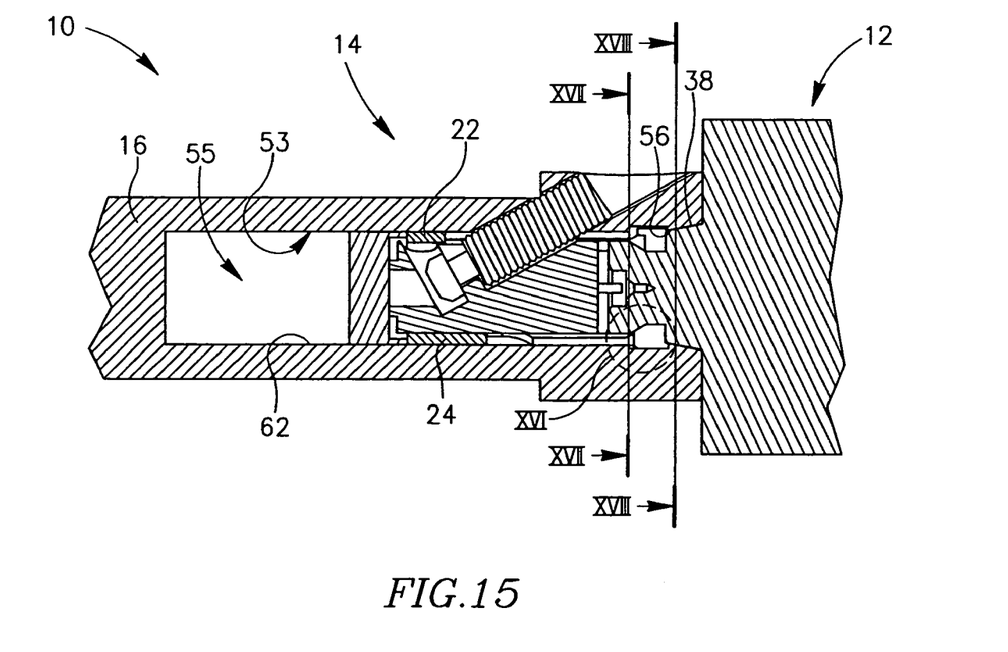
FIG. 15 is a longitudinal cross sectional view of the tool assembly in a locked position, taken in the plane M-M shown in FIG. 1.

First, the alignment surface 62 applies an inwardly radial force on each bulge portion 92 thereby urging the fingers 78, 80 closer together and causing the inner bulge surfaces 96 to close onto the head 42 of the tool 12.

Second, the collet sub-assembly draws the tool 12 further into the cavity 52 until a forward abutment region (defined at the cross section XVIII-XVIII, FIG. 18) is formed by abutment of at least a portion of each shank plane 38 of the tool 12 with at least a portion of each cavity plane 56 of the tool holder 14.

Third, the collet sub-assembly draws the tool 12 even further into the cavity 52 thereby urging the inner bulge surface 96 of each bulge portion 92 to slide rearwardly and outwardly on the head 42 until a rear abutment region (defined at the cross section XVII-XVII, FIG. 17) is formed by tight abutment between the inner bulge surface 96 and outer bulge surface 94 of each bulge portion 92 with the head 42 of the tool 12 and alignment surface 62 of the tool holder 14, respectively. It should be noted that in the locked-position there is a gap G (FIG. 16) between the peripheral surface of the cap 44 and the inner surface 90 of each finger 78, 80.

The forward and rear regions of abutment are formed independently as described above; therefore alignment between the tool axis A and the sleeve axis B does not rely on tight manufacturing tolerances of the surfaces associated therewith. For example, the widths X1, X2 between opposing shank planes 38 and the distances Y1, Y2 between opposing cavity planes 56 can be manufactured within tolerances of over several tens of microns.

Figure 18:
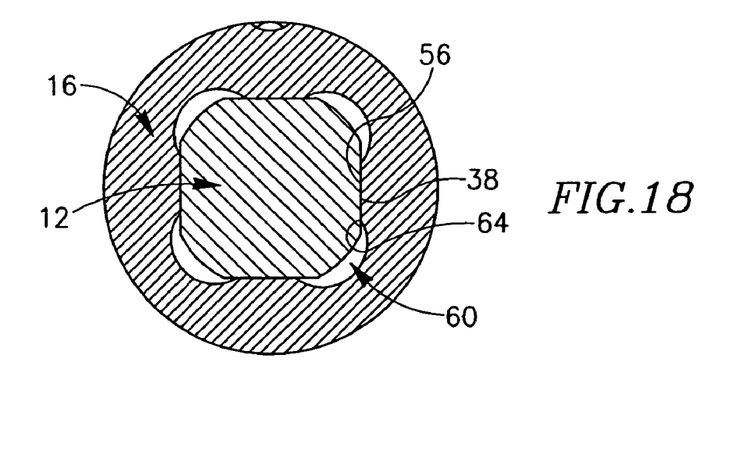
FIG. 18 is a longitudinal cross sectional view of the tool assembly in the locked position, taken along the line XVIII-XVIII in FIG. 15.

The arrangement of torque transfer in the present invention will now be compared to the prior art. In the present invention, transmission of torque from the sleeve 16 of the tool holder 14 to the tool 12 is performed by normal forces which act mainly along the socket ribs 64 (FIG. 18).

In prior art tool assemblies, which have a conical shaped shank and socket, torque is transferred from the conical surface of the socket to the conical surface of the shank by frictional force. For efficient transfer of torque by frictional force, it is required to pre-load the shank into the socket using a significant force F1 which ensures a high degree of contact between the conical surface of the shank and the conical surface of the socket by, inter alia, causing elastic deformation in the shank and socket.

In the present invention, a force F2 being generally half the magnitude of F1, provides the required abutment between the shank and socket due to the fact that, inter alia, no elastic deformation is required.

It is noted that prior art tool assemblies which have a generally rounded geometry (cone/cylinder) prevent any option for indexing the tool in the tool holder. This option exists in the present invention and is an advantage in operations such as turning.

Although the present invention has been described to a certain degree of particularity, it should be understood that various alterations and modifications could be made without departing from the scope of the invention as hereinafter claimed.

The invention claimed is:

1. A tool assembly comprising:
  a tool holder comprising a sleeve, a collet and a pusher;
  the sleeve having a longitudinal sleeve axis and comprising:
    a cavity having a cavity wall which opens out to a forward end thereof, the cavity wall comprising a forward tapering portion and a cylindrical portion, the forward tapering portion tapering axially rearwardly from the forward end of the sleeve towards the cylindrical portion;
  the collet comprising:
    a collet head comprising a base at a rear end, the base having an axially extending cylindrical peripheral surface; and
    a finger portion comprising at least two bulge portions at a forward end of the collet, each bulge portion comprising an outer bulge surface and an inner bulge surface, the outer bulge surface having an axially extending cylindrical shape and the inner bulge surface laying on a forwardly tapering conical surface; and
  the pusher comprising:
    a pusher body having a longitudinal pusher axis and a rear end, the pusher being configured and dimensioned to be inserted, with the pusher body's rear end leading, into the forward end of the collet until a portion of the pusher abuts a forwardly facing surface of the collet; and
  a tool having a longitudinal tool axis and comprising a tool head, a coupling member and a shank therebetween; the shank tapering axially rearwardly from the tool head to the coupling member, the coupling member extending axially rearwardly from the shank and comprising a forwardly tapering frustoconical head.

2. The tool assembly according to claim 1, wherein, in an assembled state:
  the pusher is located in the collet with a portion of the pusher abutting a forwardly facing surface of the collet;
  the collet is located within the cavity of the sleeve; and
  the tool is removably secured to the tool holder.

3. The tool assembly according to claim 2, wherein, in a locked-position of the tool assembly, the shank abuts the forward tapering portion of the cavity wall, the peripheral surface of the base abuts the cylindrical portion of the cavity wall, and the inner and outer bulge surfaces of each bulge portion abut, respectively, the head of the coupling member and the cylindrical portion of the cavity wall.

4. The tool assembly according to claim 3, wherein:
the base of the collet has a base surface on a forward end thereof, and a base wall extending forwardly and away from the circumference of the base surface, and a plurality of fingers having each an inner surface, each finger extending forwardly from the base wall and terminating in a given bulge portion;
the coupling member further comprises a shaft and a cylindrical cap, the shaft being located between the shank and the head of the coupling member and the cylindrical cap being located at a rear end of the head of the coupling member; and
in the locked-position of the tool assembly there is a gap between the inner surface of each finger and the cylindrical cap of the coupling member.

5. The tool assembly according to claim 2, wherein:
the sleeve further comprises a bore slanted with respect to the longitudinal sleeve axis from a periphery of the sleeve;
the collet further comprises at least one opening in the finger portion;
the pusher has a longitudinal recess formed in the pusher body; and
a locking screw occupies the bore of the sleeve, the at least one opening in the finger portion of the collet, and the longitudinal recess of the pusher body.

6. The tool assembly according to claim 1, wherein a peripheral surface of the shank comprises at least three shank planes, and the forward tapering portion of the cavity wall comprises at least three cavity planes.

7. The tool assembly according to claim 6, wherein the shank planes are symmetrically distributed around the tool axis and the cavity planes are symmetrically distributed around the sleeve axis and the number of cavity planes is identical to the number of shank planes.

8. The tool assembly according to claim 7, wherein each cavity plane and each shank plane slant respectively towards the sleeve axis and tool axis at a generally similar angle.

9. The tool assembly according to claim 7, wherein the number of shank planes is four and the number of cavity planes is four.

10. The tool assembly according to claim 1, wherein the axial extension of the inner bulge surface overlaps the axial extension of the outer bulge surface.

11. The tool assembly according to claim 1, wherein the base of the collet has a base surface on a forward end thereof, and a base wall extending forwardly and away from the circumference of the base surface, and a plurality of fingers having each an inner surface, each finger extending forwardly from the base wall and terminating in a given bulge portion.

12. The tool assembly according to claim 11, wherein the coupling member further comprises a shaft and a cylindrical cap, the shaft being located between the shank and the head of the coupling member and the cylindrical cap being located at a rear end of the head of the coupling member.

13. A tool assembly comprising a tool holder and a tool removably secured to a forward end thereof; wherein:
the tool has a longitudinal tool axis and comprises a tool head, a coupling member and a shank therebetween; the shank tapers axially rearwardly from the tool head to the coupling member, the coupling member extends axially rearwardly from the shank and comprises a frustoconical head that tapers forwardly,
the tool holder comprises a sleeve, a collet and a pusher, the sleeve having a longitudinal sleeve axis and comprising:
a cavity having a cavity wall which opens out to a forward end thereof, the cavity wall comprising a forward tapering portion and a cylindrical portion, the forward tapering portion tapering axially rearwardly from the forward end of the sleeve towards the cylindrical portion;
the collet is located within the cavity and comprises:
a collet head comprising a base at a rear end, the base having an axially extending cylindrical peripheral surface; and
a finger portion comprising at least two bulge portions at a forward end of the collet, each bulge portion comprising an outer bulge surface and an inner bulge surface, the outer bulge surface having an axially extending cylindrical shape and the inner bulge surface laying on a forwardly tapering conical surface, and
the pusher is located in the collet with a portion of the pusher abutting a forwardly facing surface of the collet, the pusher comprising:
a pusher body having a longitudinal pusher axis and a rear end, the pusher being configured and dimensioned to be inserted, with the pusher body's rear end leading, into the forward end of the collet; and
in a locked-position of the tool assembly, the shank abuts the forward tapering portion of the cavity wall, the peripheral surface of the base abuts the cylindrical portion of the cavity wall, and the inner and outer bulge surfaces of each bulge portion abut, respectively, the head of the coupling member and the cylindrical portion of the cavity wall.

14. The tool assembly according to claim 13, wherein a peripheral surface of the shank comprises at least three shank planes, and the forward tapering portion of the cavity wall comprises at least three cavity planes, and an annular groove is located on the cavity wall between the forward tapering portion and the cylindrical portion.

15. The tool assembly according to claim 14, wherein the shank planes are symmetrically distributed around the tool axis and the cavity planes are symmetrically distributed around the sleeve axis and the number of cavity planes is identical to the number of shank planes.

16. The tool assembly according to claim 15, wherein each cavity plane and each shank plane slant respectively towards the sleeve axis and tool axis at a generally similar angle.

17. The tool assembly according to claim 15, wherein the number of shank planes is four and the number of cavity planes is four.

18. The tool assembly according to claim 13 wherein the axial extension of the inner bulge surface overlaps the axial extension of the outer bulge surface.

19. The tool assembly according to claim 13 wherein the base of the collet has a base surface on a forward end thereof, and a base wall extending forwardly and away from the circumference of the base surface, and a plurality of fingers having each an inner surface, each finger extending forwardly from the base wall and terminating in a given bulge portion.

20. The tool assembly according to claim 17, wherein the coupling member further comprises a shaft and a cylindrical cap, the shaft being located between the shank and the head of the coupling member and the cylindrical cap being located at a rear end of the head of the coupling member.

21. The tool assembly according to claim 20, wherein in the locked-position of the tool assembly there is a gap between the inner surface of each finger and the cylindrical cap of the coupling member.

22. The tool assembly according to claim 13, wherein:
the sleeve further comprises a bore slanted with respect to the longitudinal sleeve axis from a periphery of the sleeve;
the collet further comprises at least one opening in the finger portion;
the pusher has a longitudinal recess formed in the pusher body; and
a locking screw occupies the bore of the sleeve, the at least one opening in the finger portion of the collet, and the longitudinal recess of the pusher body.

23. A tool assembly comprising:
a tool holder comprising a sleeve, a collet and a pusher;
the sleeve having a longitudinal sleeve axis and comprising a cavity having a cavity wall which opens out to a forward end thereof, the cavity wall having a forward tapering portion comprising at least three cavity planes;
the collet having a rear end and a forward end; and
the pusher comprising a pusher body having a longitudinal pusher axis and a rear end, the pusher being configured and dimensioned to be inserted, with the pusher body's rear end leading, into the forward end of the collet; and
a tool having a longitudinal tool axis and comprising a tool head, a coupling member and a shank therebetween; the shank tapering axially rearwardly from the tool head to the coupling member and comprising at least three shank planes, the coupling member extending axially rearwardly from the shank and comprising a forwardly tapering frustoconical head,
wherein:
the collet is located within the cavity of the sleeve;
the pusher is located in the collet with a portion of the pusher abutting a forwardly facing surface of the collet;
the tool is removably secured to the tool holder via the forward end of the collet, with an inner surface of the forward end of the collet abutting the head of the coupling member and an outer surface of the forward end of the collet abutting the cavity wall; and
the at least three cavity planes abut the at least three shank planes to thereby rotate the tool, upon rotation of the tool holder.

24. The tool assembly according to claim 23, wherein the shank planes are symmetrically distributed around the tool axis and the cavity planes are symmetrically distributed around the sleeve axis and the number of cavity planes is identical to the number of shank planes.

25. The tool assembly according to claim 24, wherein a total of four shank planes and four cavity planes are provided.

26. The tool assembly according to claim 23, wherein:
the sleeve further comprises a bore slanted with respect to the longitudinal sleeve axis from a periphery of the sleeve;
the collet further comprises at least one opening in a finger portion of the collet;
the pusher has a longitudinal recess formed in the pusher body; and
a locking screw occupies the bore of the sleeve, the at least one opening in the finger portion of the collet, and the longitudinal recess of the pusher body.

* * * * *